United States Patent

Pak et al.

[11] Patent Number: 5,883,041
[45] Date of Patent: Mar. 16, 1999

[54] COMPOSITE CATALYST FOR PURIFYING EXHAUST GASES FROM CARBON MONOXIDE AND ORGANIC COMPOUNDS

[75] Inventors: Vyacheslav Nikolaevich Pak, St. Petersburg; Vladimir Borisovich Kopylov, St. Petersburgh, both of Russian Federation

[73] Assignee: Connolly International Ltd., Lowell, Mass.

[21] Appl. No.: 831,735

[22] Filed: Apr. 1, 1997

Related U.S. Application Data

[63] Continuation-in-part of Ser. No. 676,585, Jul. 8, 1996, abandoned.

[51] Int. Cl.[6] .................................................. B01J 23/00
[52] U.S. Cl. ........................... 502/524; 502/325; 502/340; 502/414; 502/341
[58] Field of Search .................................... 502/524, 325, 502/340, 341, 414

[56] References Cited

U.S. PATENT DOCUMENTS 3,957,691  5/1976  Adachi et al. ........................... 252/465
4,261,862  4/1981  Kinoshita et al. ....................... 252/462

Primary Examiner—Walter D. Griffin
Assistant Examiner—Nadine Preisch
Attorney, Agent, or Firm—Don Halgren

[57] ABSTRACT

A composite active phase/support catalyst for purifying exhaust gases, the active phase of which comprises a solid solution of transition metals oxides with a spinel structure of the formula $AB_2O_4$ wherein "A" comprises a combination of metals with their stoichiometric indexes being in the range $Zn_{0.18-0.21}Cd_{0.18-0.21}Co_{0.18-0.63}Fe_{0.02-0.46}$ and "B" also comprises the combination of transition metals with their stoichiometric indexes being in the range $Cu_{0.09-0.36}Ni_{0.09-0.11}Cr_{0.24-0.48}Fe_{0.28-0.34}$. The support comprises an oxide carrier coated with oxide layer having a spinel structure of the formula $Cu_{0.33}Co_{0.33}Ni_{0.33}Al_2O_4$ whereas the amount of the active phase per support surface lies in the range 10–12 $\mu$Moles of $AB_2O_4$ per $1m^2$ of support surface.

5 Claims, No Drawings

COMPOSITE CATALYST FOR PURIFYING EXHAUST GASES FROM CARBON MONOXIDE AND ORGANIC COMPOUNDS

This application is a continuation-in-part of application Ser No. 08/676,585 filed on Jul. 08, 1996 now abandoned.

BACKGROUND OF THE INVENTION

1. Field of the Invention

This Application relates to a catalyst for high purification of exhaust gases of internal combustion engines and of industry, mainly from carbon monoxide and organic compounds which catalyst is free of platinum and/or palladium and rhodium and other precious and rare metals and has an excellent converting activity at moderate temperatures and limit-level of thermostability not lower than 1000° C. This Application is a Continuation-In-Part Application of our earlier U.S. patent application Ser. No. 08/676,585 now abandoned, which is incorporated herein by reference, in its entirety.

2. Description of the Prior Art

Transition metal oxides show catalytic activity in the processes of deep oxidation of carbon monoxide and organic compounds. The most active among them are complex metal oxide structures named perovskites and spinels which are potentially competitive towards well known catalysts containing precious metals.

Thus complex oxides catalyst with perovskite structure was disclosed in patent literature represented by general formula $Ln_{1-x}A_xMO_3$, wherein Ln is at least one rare earth metal. "A" is alkaline earth metal, and "M" represents at least one transition element and "X" varies in range O<X<1. These catalysts have been expected to be put into practical use as an inexpensive 3-way catalysts for converting carbon monoxide (CO), hydrocarbons (HC) and nitrogen oxides ($NO_x$). However, they can be used only at temperature below 800° C. and are therefore unsatisfactory as catalyst for automobile exhaust gases because such catalysts are required to have a high catalytic activity and durability in a temperature range as high but not lower than 900° C. It is to be noted also, that neither low temperature activity nor stability to poisoning is claimed at all for $Ln_{1-x}A_xMO_3$.

Good activity and resistance to high temperatures up to 1050° C. were also maintained for the catalyst for treating exhaust gas from vehicle engines which comprises a sintered substance composed of ferric oxide and at least one other metallic oxide of the group consisting of copper, manganese, and chromium oxide and forming at least in part a spinel crystal structure. These catalytic sintered masses may also include aluminum oxide as reinforcing agent and other additives, such as MgO, CaO, $SiO_2$, $V_2O_5$, NiO, $Co_3O_4$, ZnO, Ce, Sb, Co, Ti, K, Ag, W.

However, this catalyst cannot be said to be satisfactory in practical use because of its insufficient activity. The temperatures corresponding to complete carbon monoxide (CO) and hydrocarbon (CH) oxidation on this catalyst are markedly above about 300° C. This catalysts' imperfection is caused mainly by two factors. The first of them is due to the process for catalyst manufacturing, i.e. high temperature sintering of individual oxide mixtures. In the consequence of this procedure catalyst particles have very low surface area. This shortcoming seriously restricts catalyst productivity in oxidation process. The second factor which causes catalyst inadequate activity is due to some limitations of its composition and structure. This conclusion implies that oxide ratios in starting mixtures are those forming at least in part a spinel crystal structure in the course of sintering. Thus, sintered catalytic mass is essentially heterogeneous, i.e. contains in part a catalytically active spinel structure along with several moderately active and inactive individual metal oxides that reduce catalysts productivity in CO and CH oxidation processes.

Binary oxide spinel structures of the formula $MAl_2O_4$ wherein "M" is Cu, Mn, Mo, Zn, Fe, Co, Ni or Sr are also known in the art as materials for carrier coating in manufacturing of supported Pt, Pd-containing catalysts useful in the purification of exhaust gases. The function of this spinel-containing coating is to improve Pt(Pd)-catalysts durability and service life. However, it seems to the present inventors that this coating composition, as well as the method of its deposition onto the carrier can be improved. The principal limitation is that said spinel is used in a form of sintered particles and therefore cannot form continuous film on a carrier surface. Besides that, there is a simple binary composition of said spinel which reduces its adhesion as well as its long-term maintenance of support thereon as an active form.

BRIEF SUMMARY OF THE INVENTION

Accordingly, it is an object of the present invention to provide a transition metal oxide catalyst with a spinel structure for purifying exhaust gases of carbon monoxide and organic compounds which catalyst of the present invention has activity and thermostability higher than those in the case of conventional catalysts.

As a result, the present inventors provide a composite active phase/support catalyst for purifying exhaust gases, which active phase represents a solid solution of transition metals oxides with a spinel structure of the formula $AB_2O_4$ wherein "A" comprises a combination of transition metals with their stoichiometric indexes being in the range $Zn_{0.18-0.24}Cd_{0.18-0.21}Co_{0.28-0.63}Fe_{0.02-0.46}$ and "B" also comprises the combination of transition metals with their stoichiometric indexes being in the range $Cu_{0.09-0.36}Ni_{0.09-0.11}Cr_{0.24-0.48}Fe_{0.28-0.34}$ and the support of which comprises an oxide carrier coated with oxide layer having a spinel structure of the formula $Cu_{0.33}Co_{0.33}Ni_{0.33}Al_2O_4$.

The catalyst's high activity is determined by its multi-component spinel structure which secures two necessary conditions of the effective oxidation catalytic process. The first of them comprises high concentration and diffusion rates of active oxygen which exchanges between the catalyst's volume and its surface. The second condition comprises an ongoing electron exchange in the oxidation reduction process due to the transition metals valence transfers such as: $Co^{2+} \leftrightarrow Co^{3+}$, $Fe^{2+} \leftrightarrow Fe^{3+}$, $Cu^{2+} \leftrightarrow Cu^+$, $Cr^{3+} \leftrightarrow Cr^{4+}$. Therefore, it is the multicomponent composition of the spinel solid solution that realizes these two conditions. Moreover, nonadditive effect takes place in this complicated system which comprises its catalytic action which is essentially surprisingly higher than a sum of its components individual actions. The important result of the support and catalyst phases consecutive loading is that an oxide support with a spinel structure secures the maintaining of an active spinel solution in a highly homogeneous order and thus determines either catalyst's excellent performance or its stability to high temperatures. As a result, this invention is based on the surprising effect of nonadditive formation of essentially new qualities in a multicomponent oxide system. Thus, the behavior of a multicomponent active phase as well as of a multicomponent carrier coating is quite nonadditive.

Another important factor comprises a necessity of chemical compatibility of oxide spinel $AB_2O_4$ and oxide carriers, such as alumina, alumo-silica, titania, zirconia et. al. The coating of a carrier with a spinel layer of the formula $Cu_{0.33}Co_{0.33}Ni_{0.33}Al_2O_4$ prior to catalyst deposition is necessary in order either to improve adhesion strengths within a system, or to set up a mutual oxygen sublattice with a high ionic capacity and mobility which improves catalytic activity. Also, an important factor is that a spinel structure is thermodynamically more stable than corresponding metal aluminates, silicates, titanates, or zirconates, and therefore, a reaction of an active component with a coated carrier is thereby prevented. Thus the active phase is prevented from migration and sintering.

Consequently, even after the catalyst is used at a high temperature such as 1000° C. or above for a long period, it is quite possible to maintain the active spinel phase in a highly dispersed state on a coated carrier surface, thereby maintaining a high catalyst purifying activity.

DESCRIPTION OF THE PREFERRED EMBODIMENTS

The present invention represents an improvement over prior art catalysts in air purification from carbon monoxide and hydrocarbons with regard to improved composition, performance and thermostability.

It has now been found that a catalyst system of high catalytic activity can be formulated by coating a complex oxide layer having a spinel structure of the formula $Cu_{0.33}Co_{0.33}Ni_{0.33}Al_2O_4$ on a catalyst carrier and then further coating the coated carrier with complex oxide solid solution having spinel structure of the formula $AB_2O_4$, wherein "A" represents a combination of transition metals with their stoichiometric indexes being in the range $Zn_{0.18-0.21}Cd_{0.18-0.21}Co_{0.28-0.63}Fe_{0.02-0.46}$ and "B" also represents combination of transition metals with their stoichiometric indexes being in the range $Cu_{0.09-0.36}Ni_{0.09-0.11}Cr_{0.24-0.48}Fe_{0.28-0.34}$. In this regard, the optimal loading procedure has been worked out. It includes: a) coating of a complex oxide layer on a carrier by the means of carrier impregnation with an aqueous solution containing nitrates of Cu, Co, Ni and Al, their molar concentrations in solution being in agreement with spinel formula $Cu_{0.33}Co_{0.33}Ni_{0.33}Al_2O_4$ followed by drying and calcining; b) coating of the main catalytic active spinel layer onto the previously coated carrier by the means of the coated carrier impregnation with an aqueous solution containing nitrates of transition metals, their molar concentrations in solution being in agreement with the catalyst's spinel formula $AB_2O_4$, wherein "A" represents a combination of metals with their stoichiometric indexes being in the range $Zn_{0.18-0.21}Cd_{0.18-0.21}Co_{0.18-0.68}Fe_{0.02-0.46}$ and B also represents combination of metals with their stoichiometric indexes being in the range $Cu_{0.09-0.36}Ni_{0.09-0.11}Cr_{0.24-0.48}Fe_{0.28-0.34}$ followed by drying and calcining. Metal concentration in solution is to be optimized as well as the above mentioned coating procedure is to be repeated for several times in order to provide the amount of active phase per support surface area in the range 10–12 $\mu$Mole/m$^2$. The last criterium was maintained experimentally and its explanation is as follows. A portion of metal nitrates loaded onto a support as a result of impregnation must be as moderate as needed for its full thermodecomposition and a spinel solution formation without serious diffusion restrictions. An active phase amount lower than 10 $\mu$Mole/m$^2$ leads to a noticeable reduction in a catalyst activity because of shortage of an active component loaded, whereas the increase of an amount of active phase above 12 $\mu$Mole/m$^2$ also causes the lowering of the catalyst activity due to insufficient homogeneity of the active component which includes some individual oxides along with active spinel solid solution.

Moreover, an active phase loaded in excessive quantity, i.e. greater than about 12 $\mu$Mole/m$^2$, causes weakening of its adhesion with support and therefore sintering and aggregation of an active phase may become possible at high temperatures, such as 1000° C. or above. Thus, the active phase amount criterium is of high importance. Conventional procedure which secures this criterium with the use of routine chemical methods is given in examples below.

The operations of drying and calcining are commonly used in a catalyst preparation. A steady drying in air at 140° C. for about 2 to 6 hours is accompanied by a removal of the water-solvent and homogeneous distribution of a metal nitrates mixture on a carrier surface. A calcining operation is preferably a two-stage process in air, that comprises thermal decomposition of a metal's nitrates at 500° C. in the course of about 3 hours and finally the formation of the homogeneous spinel structure at 800° C. within 5 hours.

The essential feature of the catalyst is a carrier which is a refractory inorganic oxide selected from the group consisting of alumina, alumina silica, titania, zirconia and other thermostable oxides and mixtures thereof with alumina being preferred. When alumina is the desired carrier, any alumina which is well known in the art, may be used in a shape such as pills, pellets, granules, rings, spheres, etc. If it is desirable to employ a monolithic form, it is usually most convenient to employ the support as a thin film or coating deposited on an inert carrier which is a suitable ceramic or metallic material. It is preferred that the monolithic carrier configuration be a honeycomb structure. The support may be deposited on said monolithic carrier by any conventional means known in the art, the most convenient method being by dipping a carrier into a slurry of the support. When alumina is the desired support, it is preferably present on the monolithic carrier in amounts in the range from about 28 to 355 g of support per liter of carrier volume where the volume is measured by the exterior dimensions of the monolithic carrier.

In order to further illustrate the present invention and the advantages thereof, the alumina beads were used as the thermostable support. The following specific examples are given, it being understood that same are intended only as illustrative and in no way is limitative.

EXAMPLE 1

As a carrier of 100 g of macropores, alumina beads were used which had a specific surface area of 100 m$^2$/g and total pore volume 1.20 cm$^3$/g. These beads were impregnated with 120 cm$^3$ of an aqueous solution No. 1 of metal nitrates containing in total 0.1 Mole of metals, namely 1.88 g of Al, 0.69 g of Cu, 0.64 g of Ni and 0.67 g of Co. After 30 minutes of impregnation, beads were dried at 140° C. for 5 hours and then calcined in air at 500° C. for 3 hours and finally at 800° C. for 5 hours. Thus, a coating oxide spinel layer of the formula $Cu_{0.33}Co_{0.33}Ni_{0.33}Al_2O_4$ was deposited. Then the beads, coated with the spinel layer, were then impregnated with 120 cm$^3$ of an aqueous solution number N2 of metal nitrates containing total 0.1 mole of metals, namely 0.39 g of Zn, 0.67 g of Cd, 1.22 g of Co, 1.19 g of Fe, 1.52 g of Cu, 0.35 g of Ni and 0.83 g of Cr. After 30 minutes of impregnation, the beads were dried at 140° C. for 5 hours and then calcined in air at 500° C. for 3 hours and finally at 800° C. for 5 hours. Thus the active polyoxide spinel layer was deposited. This coating procedure was done three times in order to load a total amount about 0.3 Mole of metals onto carrier surface and therefore the criterium of 10 μMoles of $AB_2O_4$ per 1m² of a carrier was satisfied. The stoichiometry of the loaded active phase corresponds to spinel formula $AB_2O_4$ wherein "A" represents metals combination $Zn_{0.18}Cd_{0.18}Co_{0.62}Fe_{0.02}$ and "B" represents metals combination $Cu_{0.36}Ni_{0.09}Cr_{0.24}Fe_{0.31}$. Sample N1 thus was obtained.

EXAMPLE 2

A Catalyst (sample N2) was prepared according to example 1, except that solution N2 contained a total of 0.09 Moles of metals, namely 0.35 g of Zn, 0.61 g of Cd, 0.32 g of Co, 1.91 g of Fe, and o.34 g of Cu, 0.32 g of Ni and 1.50 g of Cr and a loading procedure was done four times in order to load the total amount about 0.36 Moles of metals onto the carrier surface and therefore to satisfy the criterium of 12 μMoles of $AB_2O_4$ per 1m² of a carrier. The stoichiometry of the loaded active phase corresponds to spinel formula $AB_2O_4$ wherein "A" represents metal combination $Zn_{0.18}Cd_{0.18}Co_{0.18}Fe_{0.46}$ and "B" represents metal combination $Cu_{0.09}Ni_{0.09}Cr_{0.48}Fe_{0.34}$.

EXAMPLE 3

A catalyst (sample No. 3) was prepared according to Example 1 except that solution 2 contained total about 0.11 Moles of metals, namely 0.50 g of Zn, 0.86 g of Cd, 0.71 g of Co, 1.69 g of Fe, 0.70 g of Cu, 0.47 g of Ni, 1.77 g of Cr, and a loading procedure was done three times in order to load total amount about 0.33 Moles of metals onto carrier surface to secure the criterium of about 11 μMoles of $AB_2O_4$ per 1 m² of a carrier surface. The stoichiometry of the loaded active phase corresponds to spinel formula $AB_2O_4$ wherein "A" represents metal combination $Zn_{0.21}Cd_{0.21}Co_{0.33}Fe_{0.25}$ and "B" represents metal combination $Cu_{0.15}Ni_{0.11}Cr_{0.45}Fe_{0.29}$.

Control 1

A catalyst (sample No. 4) was prepared according to Example 1 except that solution No. 1 of metal nitrates contained in total 0.1 Mole of metals namely 1.88 g of Al and 2.07 g of Cu that resulted in coating oxide spinel layer of the formula $CuAl_2O_4$.

Control 2

A catalyst (sample No. 5) was prepared according to example 1 except that solution No. 1 of metal nitrates contained in total 0.1 Mole of metals, namely 1.88g of Al and 1.92g of Ni that resulted in coating oxide spinel layer of the formula $NiAl_2O_4$.

Control 3

To a mixture composed of 55 mol% of ferric oxide, 25 mol% of manganese oxide 15 mol% of zinc oxide and 5 mol% of cupric oxide was added 3% by weight of vanadium pentoxide and, after making the mixture into a solid mass by applying a load of 1000 kg/cm², it was sintered by heating for about two hours at about 1350° C. The sintered substance was then crushed into particles of 2–5 mm in diameter. Thus, sample No. 6 for comparative example was prepared.

Control 4

To a mixture of 40 mol% of ferric oxide, 32 mol% of manganese dioxide, 8 mol% of cupric oxide and 20 mol% of aluminum oxide was added 20% by weight, based on the total amount of the metallic oxide, of a 6% aqueous solution of polyvinyl alcohol as a binder and the resultant mixture was first shaped into pills and then molded into columns of 3.2 mm in diameter×3.2 mm in length by application of a load of 1000 kg/cm² and heated at about 900° C. to effect sintering. Thus, sample No. 7 for comparative example was prepared.

Control 5

To a mixture composed of 40 mol% of ferric oxide, 48 mol% by manganese dioxide and 12 mol% of cupric oxide was added 20% by weight, based on the total weight of said metallic oxides, of a 6% aqueous solution of polyvinyl alcohol as a binder and, after shaping the resultant mixture once into pills, the mixture was shaped into a small column of 3.2 mm in diameter×3.2 mm in length by application of a load of 1000 kg/cm² and then sintered at about 900° C. for about 2 hours. The sintered substance was further heated at 700° C. for about 10 hours in oxygen atmosphere to fix oxygen. Thus, sample No. 8 for comparative example was prepared.

Evaluation

A comparison was undertaken to establish especially the efficiency of the catalysts (test 1). The conditions under which the test 1 was performed included an inlet air containing 1.5% by volume of carbon monoxide or lead-containing gasoline vapors ($C_5$–$C_{12}$ plus $PbEt_4$), space velocity being 30000$h^{-1}$. A treated gas lowest temperature which secures the complete CO or CH oxidation (e.g. the efficiency of 100%) was considered as the parameter qualifying catalyst activity. Data of the test 1 in the table 1 below clearly show that the catalytic activity of the catalysts No. 1,2,3 prepared according to the invention is, in every case, much higher than that of catalysts prepared according to the prior art (comparative samples No. 6,7,8). It is also evident from these results that coating of oxide spinel layer of the formula $Cu_{0.33}Co_{0.33}Ni_{0.33}Al_2O_4$ onto a carrier provides high catalytic activity in comparison with a simple binary spinel coating layer namely $CuAl_2O_4$ (Sample 4) and $NiAl_2O_4$ (sample 5).

Test 2 was made in order to examine the heat resistance of the catalysts. The catalysts produced in examples 1–3 and comparative examples 4–8 were heated to 1100° C. for 50 hours in air. Afterwards they were examined within the procedure of the prior test, e.g. the lowest temperature of the complete oxidation of CO and CH was determined. The results of test 2 are also listed in the table 1. The catalysts of the present invention are superior in the heat resistance to those of comparative examples.

In test 3 the catalysts were subjected to durability test of purifying activity of inlet gas for 5 hours at 1030° C. and then for 100 hours at 400° C. The composition of the inlet gas was 1.5% by volume of lead-containing gasoline vapor in the air. Afterwards, the lowest temperature of complete oxidation of CO and CH was measured. The results of test 3 are shown in table 1 hereinbelow. The catalysts of the present invention are superior in the durability and resistance to poisoning to those of comparative examples.

TABLE 1

| | A lowest temperature of complete oxidation, °C. | | | | | |
| | Test 1 | | Test 2 | | Test 3 | |
| Sample No. | CO | CH | CO | CH | CO | CH |
| This invention | | | | | | |
| 1 | 105 | 158 | 108 | 160 | 107 | 158 |
| 2 | 110 | 165 | 112 | 167 | 110 | 166 |
| 3 | 98 | 146 | 100 | 149 | 98 | 148 |
| Control | | | | | | |
| 4 | 140 | 228 | 160 | 267 | 153 | 250 |
| 5 | 165 | 246 | 184 | 285 | 174 | 265 |

TABLE 1-continued

| | A lowest temperature of complete oxidation, °C. | | | | | |
|---|---|---|---|---|---|---|
| | Test 1 | | Test 2 | | Test 3 | |
| Sample No. | CO | CH | CO | CH | CO | CH |
| Control | | | | | | |
| 6 | 420 | 463 | 438 | 485 | 445 | 470 |
| 7 | 480 | 526 | 548 | 605 | 485 | 530 |
| 8 | 456 | 620 | 535 | 694 | 475 | 654 |

The invention recited hereinabove and proven by table 1 comprises a composite active phase/support catalyst for purifying exhaust gases, which active phase represents a solid solution of transition metal oxides with a spinel structure and the support comprises a carrier coated with an oxide layer having a spinel structure. The support carrier is coated with an oxide layer having a spinel structure of the formula $Cu_{0.03}Co_{0.33}Ni_{0.33}Al_2O_4$. The solid solution of transition metal oxides with the spinel structure corresponds to the general formula $AB_2O_4$, wherein "A" comprises a combination of transition metals with their stoichiometric indexes being in the range $Zn_{0.18-0.21}Cd_{0.18-0.21}Co_{0.28-0.63}Fe_{0.02-0.46}$ and "B" also comprises the combination of transition metals with their stoichiometric indexes being in the range $Cu_{0.09-0.36}Ni_{0.09-0.11}Cr_{0.24-0.48}Fe_{0.28-0.34}$. The amount of the active spinel phase per support surface area lies in the range 10–12 $\mu$Moles /m$^2$.

What is claimed is:

1. A composite active phase/support catalyst for purifying exhaust gases, comprising:
   an active phase including a solid solution of transition metal oxides with a spinel structure, wherein said solution of transition metal oxides with a spinel structure corresponds to the general formula $AB_2O_4$, wherein "A" comprises a combination of transition metals with their stoichiometric indexes being in the range of $Zn_{0.18-0.21}Cd_{0.18-0.21}Co_{0.28-0.63}Fe_{0.02-0.45}$ and "B" comprises a combination of transition metals with their stoichiometric indexes being in the range of $Cu_{0.09-0.36}Ni_{0.09-0.11}Cr_{0.24-0.48}Fe_{0.28-0.34}$; and
   a support which comprises a carrier coated with an oxide layer having a spinel structure of the formula $Cu_{0.33}Co_{0.33}Ni_{0.33}Al_2O_4$.

2. The composite active phase/support catalyst for purifying exhaust gases as recited in claim 1 wherein the amount of the active spinel phase per support surface area lies in the range 10–12 $\mu$Moles/m$^2$.

3. The composite active phase/support catalyst for purifyng exhaust gases as recited in claim 1, wherein said carrier is comprised of alumina.

4. The composite active phase/support catalyst for purifying exhaust gases as recited in claim 1, wherein said carrier is formed into an elongated honeycomb structure.

5. The composite active phase/support catalyst for purifyng exhaust gases as recited in claim 3, wherein said carrier has a surface area of 100 m$^2$/g and a pore volume of 120 cm$^3$/g.

* * * * *